United States Patent

Masuda et al.

[11] 4,013,817
[45] Mar. 22, 1977

[54] METHOD FOR ADHERING A RUBBER COMPOSITION TO A METAL MATERIAL

[75] Inventors: Kinji Masuda, Higashi-Murayama; Hideaki Saigo, Yokohama; Kazuo Naito, Kodaira; Tadashi Utsunomiya, Higashi-Murayama; Sakae Inoue, Kodaira, all of Japan

[73] Assignee: Bridgestone Tire Company Limited, Tokyo, Japan

[22] Filed: July 2, 1975

[21] Appl. No.: 592,702

[30] Foreign Application Priority Data

July 4, 1974   Japan ............................ 49-75884

[52] U.S. Cl. ........................... 428/462; 427/386; 427/388 A; 428/418
[51] Int. Cl.² .................... B05D 7/14; B05D 3/00; B32B 15/06; B32B 15/08
[58] Field of Search .......... 427/388, 386; 428/462, 428/418; 260/83.3

[56] References Cited

UNITED STATES PATENTS 3,013,926  12/1961  Railsback et al. ............. 427/388 X
3,832,274  8/1974   Owston ............................. 428/462

*Primary Examiner*—James R. Hoffman
*Attorney, Agent, or Firm*—Sughrue, Rothwell, Mion, Zinn & Macpeak

[57] ABSTRACT

A butadiene-acrylonitrile copolymer rubber (NBR) composition can be strongly adhered to a metal material by compounding (A) a halogenated aromatic hydrocarbon having the general formula

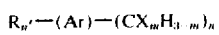

or

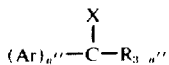

wherein Ar is benzene nucleus residue or naphthalene nucleus residue, R is a hydrocarbon residue having 1–6 carbon atoms, hydrogen atom or halogen atom, X is halogen atom, $m$ is 1–3, $n''$ is 1–3, when Ar is benzene nucleus residue, $n$ is 1–6 and $n'$ is 0–5 (provided that $n+n' \leq 6$) and when Ar is naphthalene nucleus residue, $n$ is 1–8 and $n'$ is 0–7 (provided that $n+n' \leq 8$), and (B) at least one compound selected from the oxides, carbonates, sulfides and hydroxides of metals of groups I, II, IV, V and VIII in the Periodic Table and aluminum hydroxide, to the NBR composition, contacting the resulting rubber composition to the metal material, and vulcanizing the rubber composition to adhere the composition to the metal material.

17 Claims, No Drawings

METHOD FOR ADHERING A RUBBER COMPOSITION TO A METAL MATERIAL

BACKGROUND OF THE INVENTION

1. Field of the Invention

The present invention relates to a method for adhering a rubber composition to a metal material.

2. Description of the Prior Art

Various methods for adhering a rubber composition to a metal material have been heretofore known. For example, the following methods have been proposed.

1. A method comprises subjecting metal surfaces to a specific treatment, applying polyisocyanate layer thereon and then putting a rubber layer on the polyisocyanate layer and heating the resulting assembly (Japanese Patent No. 225,414).

2. A method comprises coating a primer composed of chlorinated elastomer-butadiene-methyl methacrylate copolymer on metal surfaces (Japanese Patent No. 468,417).

3. A method comprises coating a rubber composition containing sulfur and peroxide on metal surfaces (Japanese Patent Application Publication No. 5,145/70).

In these methods, the operating steps should be increased and in some case, a particular processing installation is necessary and further there are problems in the storage stability of primer, and in the inflammability and poison of solvent.

A large number of methods wherein certain compounding agents are mixed with rubber compositions and the resulting rubber compositions are adhered to metals by vulcanization have been proposed. For example, a method comprising compounding a metal naphthenate, mainly cobalt naphthenate to a rubber; a method comprising compounding resorcin hexamethylenetetramine and silica to a rubber; and a method comprising compounding a metal oxide and one of a chlorinated paraffin and a chlorinated polymer to a rubber are known. However, in these methods, when NBR or a blend consisting mainly of NBR is used as the rubber, the adhesion of the rubber composition to zinc is very low and such methods are not practical.

For the adhesion of NBR to zinc, it has been heretofore known that ferric chloride can be compounded in NBR. However, in this method the adhesion of NBR to zinc is improved to a certain degree but rust is formed in the working machine and NBR sticks considerably to the roll and thus this method is not preferable in practice.

In addition, brass plating on a metal is a useful process for improving the adhesion and this method has been heretofore carried out, but in this case, when water or moisture of more than a certain amount is present upon the materials, the adhesion is quite poor and particular attention must be paid to process adjustment and to the storage of the material.

SUMMARY OF THE INVENTION

The present invention provides a method for adhering a rubber composition to a metal material, which comprises compounding (A) at least one of halogenated aromatic hydrocarbons having the general formula

or

wherein Ar is benzene nucleus residue or naphthalene nucleus residue and when there are two or more Ar groups, they may be same or different, R is a hydrocarbon residue having 1–6 carbon atoms, hydrogen atom or halogen atom, and when there are two or more R groups, they may be same or different, X is halogen atom and when there are two or more X groups, they may be same or different, when there are two or more $CX_mH_{3-m}$ groups, they may be same or different, $m$ is 1–3, $n''$ is 1–3, and when Ar is benzene nucleus residue, $n$ is 1–6 and $n'$ is 0–5 (provided that $n+n' \leq 6$) and when Ar is naphthalene nucleus residue, $n$ is 1–8 and $n'$ is 0–7 (provided that $n+n' \leq 8$), and (B) at least one of oxides, carbonates, sulfides and hydroxides of metals of Groups I, II, IV, V and VIII in the Periodic Table and aluminum hydroxide, to a butadiene-acrylonitrile copolymer rubber (NBR) composition, and contacting the resulting rubber composition with a metal material, and vulcanizing the rubber composition to adhere the composition to the metal material.

Thus, the main object of the present invention is to provide a novel and simple method for adhering NBR to a metal material.

Another object of the present invention is to provide butadiene-acrylonitrile copolymer rubber articles reinforced with a metal material.

According to the present invention, it is possible to obtain a composite body composed of the rubber composition and a metal material which has a high adhesion by contacting and heating NBR containing the above-described components (A) and (B) with a metal material by a conventional process to vulcanize the rubber composition.

Particularly, the present invention can provide a strong adhesion of zinc and NBR which have been very difficult to adhere. Zinc is less influenced by water presence than brass and is advantageous in the process adjustment, so that the broad use can be expected as the materials for reinforcing NBR.

Furthermore, the present invention is effective for improvement of the adhesion of NBR to not only zinc, but also to a broad scope of metals other than zinc.

Accordingly, the present invention can be advantageously used for production of rubber articles reinforced with metal materials which require an oil resistance, particularly, oil resistant hoses, oil resistant belts, particular rolls, packings, seals, gaskets, fuel tanks, diaphragms, rubber vibration insulators and vibration-damping sheets.

DETAILED DESCRIPTION OF THE PREFERRED EMBODIMENTS

The rubber to be used in the present invention includes butadiene-acrylonitrile copolymer rubber (NBR) alone and blends of NBR with at least one rubber or resin selected from butadiene rubber (BR), styrene-butadiene rubber (SBR), chloroprene rubber (CR), natural rubber, isoprene rubber (IR), isobutylene-isoprene rubber (IIR), ethylene-propylene copolymer rubber (EPR or EPDM), chlorinated rubber, epichlorohydrin rubber (CHR), chlorosulfonated polyethylene, polyvinyl chloride (PVC), chlorinated polyethylene, chlorinated polypropylene and the like. The amount of rubber or resin to be blended with NBR is 0–50 parts by weight based on 100 parts by weight of NBR. The amount of bound acrylonitrile is not particularly limited, but is 15–60 parts by weight, preferably 20–50 parts by weight, based on 100 parts by weight of total polymer in any case of NBR alone and blends thereof.

Component (A) to be compounded with a rubber composition in the present invention, that is, the halogenated aromatic hydrocarbon represented by the formula (1) or (2), is a compound wherein the hydrogen atom bonded to the carbon atom at the α-position of the nuclear substituent of an aromatic hydrocarbon, such as toluene, xylene, trimethylbenzene, tetramethylbenzene, monomethyl naphthalene, dimethylnaphthalene, diphenylmethane, triphenylmethane or the like, is substituted by the halogen atom. The halogenated aromatic hydrocarbon may have proper substituents at the other positions of the aromatic nucleus. The halogenated aromatic hydrocarbon includes benzyl chloride, α,2-dichlorotoluene, α,3-dichlorotoluene, α,4-dichlorotoluene, α,2,6-trichlorotoluene, 3,4-dimethoxybenzyl chloride, benzal chloride, α,α,2-trichlorotoluene, α,α,3-trichlorotoluene, α,α,4-trichlorotoluene, α,α,2,6-tetrachlorotoluene, α,α,2,3,6-pentachlorotoluene, α,α,α-trichlorotoluene(benzotrichloride), α,α,α,2-tetrachlorotoluene, α,α,α,3-tetrachlorotoluene, α,α,α,4-tetrachlorotoluene, α,α,α,2,4-pentachlorotoluene, α,α'-dichloro-o-xylene, α,α'-dichloro-m-xylene, α,α'-dichloro-p-xylene, α,α,α',α'-tetrachloro-o-xylene, α,α,α',α'-tetrachloro-m-xylene, α,α,α',α'-tetrachloro-p-xylene, α,α,α',α'-pentachloro-o-oxylene, α,α,α,α'-pentachloro-m-xylene, α,α,α,α',α'-pentachloro-p-xylene, 4-nitro-α,α,α-trichlorotoluene, α,α,α,α',α',α'-hexachloro-o-xylene, α,α,α,α',α',α'-hexachloro-m-xylene, α,α,α,α',α',α'-hexachloro-p-xylene, 3,4,5,6,α,α,α,α',α',α'-decachloro-o-xylene, 2,4,5,6,α,α,α,α',α',α'-decachloro-m-xylene, 2,3,5,6,α,α,α,α',α',α'-decachloro-p-xylene, 1-trichloromethylnaphthalene, 2-trichloromethylnaphthalene, 1,3-ditrichloromethylnaphthalene, 1,4-ditrichloromethylnaphthalene, 1,5-ditrichloromethylnaphthalene, 2,3-ditrichloromethylnaphthalene, 2,6-ditrichloromethylnaphthalene, α,α-dichlorodiphenylmethane, α-chlorotriphenylmethane, α,α,α-tribromotoluene, α,α,α'α'-tetrabromo-o-xylene, α,α,α',α'-tetrabromo-m-xylene, α,α,α',α'-tetrabromo-p-xylene, α,α,α,α',α'-pentabromo-o-xylene, α,α,α,α',α'-pentabromo-m-xylene, α,α,αα',α'-pentabromo-p-xylene, α,α,α,α',α',α'-hexabromo-o-xylene, α,α,α,α',α',α'-hexabromo-m-xylene, α,α,α,α',α',α'-hexabromo-p-xylene, 1-tribromomethylnaphthalene, 2-tribromomethylnaphthalene, 1,3-ditribromomethylnaphthalene, 1,4-ditribromomethylnaphthalene, 1,5-ditribromomethyl-naphthalene, 2,6-ditribromomethyl-naphthalene, α,α-dibromodiphenylmethane, α-bromotriphenylmethane, α,α,α-trifluorotoluene, 2-chloro-α,α,α-trifluorotoluene, 3-chloro-α,α,α-trifluorotoluene, 4-chloro-α,α,α-trifluorotoluene, 2-bromo-α,α,α-trifluorotoluene, 3-bromo-α,α,α-trifluorotoluene, 3-nitro-α,α,α-trifluorotoluene, 3-chloro-6-nitro-α,α,α-trifluorotoluene, 2-chloro-5-nitro-α,α,α-trifluorotoluene, 4-chloro-3-nitro-α,α,α-trifluorotoluene, 4-chloro-3hydroxy-α,α,- α-trifluorotoluene,- α, ,α,α,α',α',α'-hexafluoro-m-xylene, 5-nitro -α,α,α,α',α', α', -hexafluoro-m-xylene, 2-trifluoromethylbenzoic acid, 4-trifluoromethylbenzoic acid and the like. Among them, α,α,α-trichlorotoluene,α,α,α, 2-tetrachlorotoluene, α,α,α,3-tetrachlorotoluene,α,α,α,4-tetrachlorotoluene, α,α,α,2,4-pentachlorotoluene, α,α,α,α',α',α'-hexachloro-o-xylene, α,α,α,α',α',α'-hexachloro-m-xylene, α,α,α,α',α',α'-hexachloro-p-xylene, α,α-dichlorodiphenylmethane, α-chlorotriphenylmethane, α,α,α-tribromotoluene, α-bromotriphenylmethane and the like, are preferable. Particularly, α,α,α-trichlorotoluene, α,α,α,2-tetrachlorotoluene, α,α,α,3-tetrachlorotoluene, α,α,α,4-tetrachlorotoluene, α,α,α,2,4-pentachlorotoluene, α,α,α,α',α',α'-hexachloro-m-xylene and α,α,α,α',α' ,α'-hexachloro-p-xylene are preferable.

These halogenated aromatic hydrocarbons are used alone or in admixture. The amount of the halogenated aromatic hydrocarbon of component (A) to be compounded to the rubber composition is generally 0.2–20 parts by weight, preferably 0.5–10 parts by weight, based on 100 parts of total polymer.

Component (B) to be compounded to the rubber composition of the present invention is at least one compound selected from the oxides, carbonates, sulfides and hydroxides of metals of Groups I, II, IV, V and VIII in the Periodic Table and aluminum hydroxide. Embodiments of these compounds are metal oxides, such as copper oxide ($Cu_2O$, $CuO$), zinc oxide ($ZnO$ and activated $ZnO$), magnesium oxide ($MgO$), calcium oxide ($CaO$), lead oxide ($PbO$, $Pb_2O$, $Pb_2O_3$), tin oxide ($SnO$, $SnO_2$), antimony oxide ($Sb_2O_3$), iron oxide ($Fe_2O_3$, $Fe_3O_4$) and the like; metal carbonates, such as copper carbonate ($CuCO_3$), magnesium carbonate ($MgCO_3$), calcium carbonate ($CaCO_3$), barium carbonate ($BaCO_3$), zinc carbonate ($ZnCO_3$), cadmium carbonate ($CdCO_3$) and the like; metal sulfides, such as copper sulfide ($Cu_2S$, $Cus$), barium sulfide ($BaS$), zinc sulfide ($ZnS$), cadmium sulfide ($CdS$), iron sulfide ($FeS$, $Fe_2S_3$, $FeS_2$), cobalt sulfide ($CoS$, $CoS_2$, $Co_2S_3$, $Co_2S_7$, $CO_3S_4$, $Co_9S_8$), lead sulfide ($PbS$) and the like; metal hydroxides, such as copper hydroxide ($Cu(OH)$, $Cu(OH)_2$), magnesium hydroxide ($Mg(OH)_2$), calcium hydroxide ($Ca(OH)_2$), barium hydroxide ($Ba(OH)_2$), aluminum hydroxide ($Al(OH)_3$), cobalt hydroxide ($Co(OH)_3$), lead hydroxide ($Pb(OH)_2$, $Pb(OH)_4$) and the like. These compounds are used alone or in admixture. Further, in the present invention, organic amines, such as triethylamine, diethylaniline, ethylenediamine, tetraethylenepentamine, diphenylguanidine, hexamethylenediamine, toluidine, phenylenediamine and the like, which react with hydrogen halide to form a salt, and some silicon oxides ($SiO_2$), which absorb physically or chemically hydrogen halide or halogen, may be used as component (B). Among these compounds, lead oxide, zinc oxide, magnesium oxide, barium carbonate, calcium carbonate, magnesium carbonate, zinc sulfide, cupric sulfide, magnesium hydroxide, aluminum hydroxide, calcium hydroxide are preferably used. Particularly, lead oxide, zinc oxide, magnesium oxide, barium carbonate, calcium carbonate, magnesium carbonate, zinc sulfide, magnesium hydroxide and calcium hydroxide are preferably used.

The behavior of component (B) in the rubber composition has not yet been clarified, but it is believed that component (B) absorbs the halogen atom or hydrogen halide to stabilize the rubber composition.

The amount of component (B) to be compounded is generally at least 0.5 part by weight, preferably at least 1 part by weight, based on 1 part by weight of component (A). The upper limit of component (B) is not particularly limited, and component (B) may be used in an amount of as large as more than 10 parts by weight based on 1 part by weight of component (A). However, a further improvement of the adhesive force of the resulting rubber composition cannot be expected even when such large amount is used. Accordingly, in the present invention, component (B) is preferably used in an amount of 1–7 parts by weight based on 1 part by weight of component (A).

The metal material to be used in the present invention includes zinc and zinc alloys. The zinc alloy-forming metal includes lead, nickel, titanium, copper, silver, aluminum, cadmium, antimony and the like. Moreover, in the present invention, iron, steel, copper, bronze, lead, aluminum, nickel, tin and other metals can be used as the metal material. Among these metal materials, zinc and brass are particularly preferable.

In the present invention, commonly used compounding agents, such as a vulcanizer, plasticizer, filler, antioxidant, vulcanization accelerator, vulcanization activator, reinforcing agent, etc., can be compounded with a rubber composition. These compounding agents are used in a commonly used compounding amount, for example, in a total amount of 1–200 parts by weight based on 100 parts by weight of total polymer. In general, sulfur is used as the vulcanizer, a combination of zinc oxide and stearic acid is used as the vulcanization activator similarly to the case of natural rubber and SBR, and thiazole series or sulfenamide series accelerator is used as the vulcanization accelerator. As the plasticizer, ones which are difficult to volatilize and are difficult to extract by solvent or oil are used. Further, the kind of plasticizer actually used is determined by taking the compatibility with NBR, the adhesion of the resulting rubber composition, etc., into consideration. Suitable plasticizers are di-2-diethylhexyl phthalate (DOP), dibutyl phthalate (DBP), tricresyl phosphate (TCP), diisoheptyl phthalate (DHP), diisodecyl phthalate (DID) and the like. The fillers and reinforcing agents are properly selected by taking into consideration their reinforcing ability, fugacity at kneading and influence upon the vulcanization rate, and the moldability and processability of the resulting rubber composition. The fillers and reinforcing agents are channel carbon black, furnace carbon black, silica series fillers, such as Aerosil, Hi-Sil, etc., calcium silicate, clay, chalk, baryta, heavy calcium carbonate, diatomaceous earth, talc and the like.

According to the present invention, an NBR composition and a metal material can be strongly adhered by contacting an NBR composition containing the above-described components (A) and (B) and other compounding agents with the metal material, and by vulcanizing the resulting rubber composition in a conventional manner. Further, in the present invention, an NBR composition containing the above-described components (A) and (B) can be used as a primer.

The following examples are given for the purpose of illustration of this invention and are not intended as limitations thereof. In the examples, parts mean by weight.

EXAMPLE 1 and COMPARATIVE EXAMPLES 1–5

Compounding ingredients, except sulfur and accelerator, shown in the following Table 1 were mixed on a roll according to the recipe shown in Table 1. After the resulting mixture was cooled, the additive of the present invention (component (A) and component (B) and conventional additives were added thereto together with sulfur and accelerator, and the resulting mixture was again mixed on a roll to obtain a rubber composition. A zinc-plated steel cord having a diameter of 0.38 mm was embedded in the rubber composition and the rubber composition was vulcanized at 145° C for 60 minutes by means of a hot press to prepare a test piece.

The adhesive force of the test piece, that is, a force required for drawing out the cord by 1 cm from the rubber was measured at room temperature according to ASTM D-2229 method by means of an autograph (tensile tester) made by Shimadzu Seisakusho, Ltd. In this test, the cord was drawn out at a rate of 200 mm/min. The obtained results are shown in Table 1.

Table 1

|  | Example 1 | Comparative Example 1 | 2 | 3 | 4 | 5 |
|---|---|---|---|---|---|---|
| Compounding ingredient (parts) | | | | | | |
| NBR JSR N230S* | 100 | ″ | ″ | ″ | ″ | ″ |
| Carbon black | 50 | ″ | ″ | ″ | ″ | ″ |
| Silica | 10 | ″ | ″ | ″ | ″ | ″ |
| Stearic acid | 0.5 | ″ | ″ | ″ | ″ | ″ |
| Plasticizer | 15 | ″ | ″ | ″ | ″ | ″ |
| Zinc oxide | 5 | ″ | ″ | ″ | ″ | ″ |
| Accelerator | 0.5 | ″ | ″ | ″ | 0.5 | 1.5 |
| Sulfur | 3 | ″ | ″ | ″ | 4.0 | 1.8 |
| Additive (parts) | | | | | | |
| (A) α,α,α-Trichlorotoluene | 5 | — | — | — | — | — |
| (B) PbO | 25 | — | 25 | — | — | — |
| Cobalt acetate | — | — | — | 5 | — | — |
| Cobalt naphthenate | — | — | — | — | 4 | — |
| Chlorinated paraffin** | — | — | 5 | — | — | — |
| Resorcin | — | — | — | — | — | 2.5 |
| Hexamethyleneteramine | — | — | — | — | — | 2.5 |
| Adhesive force (Kg/cm.cord) | 9.1 | 0.5 | 3.6 | 0.6 | 0.5 | 0.5 |

*Made by Japan Synthetic Rubber Co., Ltd. (amount of bound acrylonitrile: 35%)
**70% chlorinated paraffin As seen from Table 1, the rubber composition containing no halogenated aromatic hydrocarbon nor metal oxide or conventional additive (Comparative Example 1) has substantially no adhesive force. The rubber compositions containing only conventional additives (Comparative Examples 2–5) have substantially no adhesive force or a very low adhesive force for practical use. On the contrary, the rubber composition containing component (A) and component (B) of the adhesive of the present invention (Example 1) has a high adhesive force.

EXAMPLES 2–9 and COMPARATIVE EXAMPLES 6–9

The following Table 2 shows the effect of various halogenated aromatic hydrocarbons upon the adhesive force of rubber. Compounding of ingredients, vulcanization and adhesive force test were carried out in the exactly same manner as described in Example 1.

Table 2

|  | Example |  |  |  |  |  |  |  | Comparative Example |  |  |  |
|---|---|---|---|---|---|---|---|---|---|---|---|---|
|  | 2 | 3 | 4 | 5 | 6 | 7 | 8 | 9 | 6 | 7 | 8 | 9 |
| Compounding ingredient (parts) |  |  |  |  |  |  |  |  |  |  |  |  |
| NBR JSR N230S | 100 | " | " | " | " | " | " | " | " | " | " | " |
| Carbon black | 50 | " | " | " | " | " | " | " | " | " | " | " |
| Silica | 10 | " | " | " | " | " | " | " | " | " | " | " |
| Stearic acid | 0.5 | " | " | " | " | " | " | " | " | " | " | " |
| Plasticizer | 15 | " | " | " | " | " | " | " | " | " | " | " |
| Zinc oxide | 5 | " | " | " | " | " | " | " | " | " | " | " |
| Accelerator | 0.5 | " | " | " | " | " | " | " | " | " | " | " |
| Sulfur | 3 | " | " | " | " | " | " | " | " | " | " | " |
| Additive (parts) |  |  |  |  |  |  |  |  |  |  |  |  |
| Component B |  |  |  |  |  |  |  |  |  |  |  |  |
| Activated zinc oxide | 25 | " | " | " | " | " | " | " | " | " | " | " |
| Component A |  |  |  |  |  |  |  |  |  |  |  |  |
| $\alpha,\alpha,\alpha$-trichlorotoluene | 5 | — | — | — | — | — | — | — | — | — | — | — |
| $\alpha,\alpha,\alpha$,2-tetrachlorotoluene | — | 5 | — | — | — | — | — | — | — | — | — | — |
| $\alpha$,60 ,$\alpha$,4-tetrachlorotoluene | — | — | 5 | — | — | — | — | — | — | — | — | — |
| $\alpha,\alpha,\alpha$,2,4-pentachlorotoluene | — | — | — | 5 | — | — | — | — | — | — | — | — |
| $\alpha,\alpha,\alpha,\alpha',\alpha',\alpha'$-hexachloro-m-xylene | — | — | — | — | 5 | — | — | — | — | — | — | — |
| $\alpha$,$\alpha$,60 ,$\alpha',\alpha',\alpha'$-hexachloro-p-xylene | — | — | — | — | — | 5 | — | — | — | — | — | — |
| $\alpha,\alpha$-dichlorodiphenylmethane | — | — | — | — | — | — | 5 | — | — | — | — | — |
| $\alpha$-bromotriphenylmethane | — | — | — | — | — | — | — | 5 | — | — | — | — |
| Chloranil | — | — | — | — | — | — | — | — | — | 5 | — | — |
| Pentachlorophenol | — | — | — | — | — | — | — | — | — | — | 5 | — |
| 1,1-bis(p-chlorophenyl)-2,2,2-trichloroethanol | — | — | — | — | — | — | — | — | — | — | — | 5 |
| Adhesive force (Kg/cm.cord) | 16.5 | 17.0 | 15.0 | 13.0 | 10.5 | 11.5 | 14.0 | 9.0 | 0.5 | 2.0 | 0.5 | 0.5 |

As seen from Table 2, the compounds having halogen atoms directly bonded to the aromatic nucleus (Comparative Examples 7 and 8) or having halogen atoms bonded to the carbon atom at the $\beta$-position of the aromatic nuclear substituent (Comparative Example 9) have a structure similar to that of Component (A) of the present invention, but the compounds have substantially no effect in improving the adhesive forces of rubber. On the contrary, the compounds having halogen atoms bonded to the carbon atom at the $\alpha$-position of aromatic nuclear substituent (Examples 2–9), which are used as component A in the present invention, are remarkably effective for improving the adhesive force of rubber. Moreover, as seen from Examples 3, 4 and 5, the compounds having substituents, such as a halogen atom and the like, bonded to the aromatic nucleus in addition to the halogen atoms bonded to carbon atom at the $\alpha$-position of the aromatic nuclear substituent are also effective as component (A).

EXAMPLES 10–20 and COMPARATIVE EXAMPLE 10

In order to examine the effect of compounding amount of component (B) and that of component (A) upon the adhesive force of rubber, rubber compositions were prepared according to the recipes shown in the following Tables 3 and 4 in the exactly same manner as described in Example 1. The adhesive force of the rubber composition was measured in the exactly same manner as described in Example 1. The obtained results are shown in Tables 3 and 4.

Table 3

|  | Comparative Example 10 | Example |  |  |  |  |
|---|---|---|---|---|---|---|
|  |  | 10 | 11 | 12 | 13 | 14 |
| Compounding ingredient (parts) |  |  |  |  |  |  |
| NBR JSR N230S | 100 | " | " | " | " | " |
| Carbon black | 50 | " | " | " | " | " |
| Silica | 10 | " | " | " | " | " |
| Stearic acid | 0.5 | " | " | " | " | " |
| Plasticizer | 15 | " | " | " | " | " |
| Zinc oxide | 5 | " | " | " | " | " |
| Accelerator | 0.5 | " | " | " | " | " |
| Sulfur | 3 | " | " | " | " | " |
| (A) $\alpha,\alpha,\alpha$-trichlorotoluene | 5 | " | " | " | " | " |
| (B) Activated zinc oxide | 0 | 5 | 10 | 15 | 20 | 25 |
| Adhesive force (Kg/cm.cord) | 0.6 | 8.0 | 12.5 | 13.0 | 12.0 | 12.0 |

Table 4

|  | Example |  |  |  |  |  |
|---|---|---|---|---|---|---|
|  | 15 | 16 | 17 | 18 | 19 | 20 |
| Compounding ingredient (parts) |  |  |  |  |  |  |
| NBR JSR N230S | 100 | " | " | " | " | " |
| Carbon black | 50 | " | " | " | " | " |
| Silica | 10 | " | " | " | " | " |
| Stearic acid | 0.5 | " | " | " | " | " |
| Plasticizer | 15 | " | " | " | " | " |
| Zinc oxide | 5 | " | " | " | " | " |
| Accelerator | 0.5 | " | " | " | " | " |
| Sulfur | 3 | " | " | " | " | " |
| (A) $\alpha,\alpha,\alpha$-trichlorotoluene | 0.5 | 0.75 | 1.5 | 3.0 | 5.0 | 10.0 |
| (B) MgO | 2.5 | 3.75 | 7.5 | 15.0 | 25.0 | 50.0 |
| Adhesive force (Kg/cm.cord) | 8.0 | 10.3 | 16.7 | 17.8 | 17.0 | 16.0 |

As seen from Tables 3 and 4, the compounding amount of metal oxide of component B should be at least 0.5 part by weight, preferably at least 1 part by weight based on 1 part by weight of chlorinated aromatic hydrocarbon of component A. The upper limit of the amount of metal oxide is not particularly limited, but even when the amount of metal oxide is more than 10 times of the amount of chlorinated aromatic hydrocarbon, the adhesive force of the resulting rubber composition increases no more.

Further, it can be seen from Table 4 that, when halogenated aromatic hydrocarbon is used in an amount of at least 0.5 part based on 100 parts rubber, a rubber composition having a sufficiently high adhesive force for practical use can be obtained.

EXAMPLES 21-25

Rubber compositions containing NBR alone or a blend of NBR and other polymer were prepared according to the compounding recipe shown in the following Table 5, and the adhesive force of the rubber composition to a zinc-plated steel cord having a diameter of 0.38 mm was measured. Compounding of ingredients, vulcanization and adhesive force test were effected in the exactly same manner as described in Example 1. The obtained results are shown in Table 5.

Table 5

| Compounding ingredient (parts) | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|
| NBR JSR N220S[1] | 100 | — | — | 90 | 80 | 70 | — | — | — | — | — | — | — | — | — |
| NBR JSR N230S[1] | — | 100 | — | — | — | — | 90 | 80 | 70 | 70 | 70 | 70 | 70 | 80 | 80 |
| NBR JSR N240S[1] | — | — | 100 | — | — | — | 10 | 20 | 30 | — | — | — | — | — | — |
| BR JSR BR01[1] | — | — | — | — | — | — | — | — | — | — | — | — | — | — | — |
| SBR JSR 1502[1] | — | — | — | 10 | 20 | 30 | — | — | — | — | — | — | — | — | — |
| EPT[2] | — | — | — | — | — | — | — | — | — | 30 | — | — | — | — | — |
| Chlorinated polypropylene[3] | — | — | — | — | — | — | — | — | — | — | 30 | — | — | — | — |
| Chlorinated polypropylene[4] | — | — | — | — | — | — | — | — | — | — | — | 30 | — | — | — |
| PVC[5] | — | — | — | — | — | — | — | — | — | — | — | — | 30 | — | — |
| Chlorinated rubber[6] | — | — | — | — | — | — | — | — | — | — | — | — | — | 20 | — |
| CHR[7] | — | — | — | — | — | — | — | — | — | — | — | — | — | — | 20 |
| Carbon black | 50 | " | " | " | " | " | " | " | " | " | " | " | " | " | " |
| Silica | 10 | " | " | " | " | " | " | " | " | " | " | " | " | " | " |
| Stearic acid | 0.5 | " | " | " | " | " | " | " | " | " | " | " | " | " | " |
| Plasticizer | 15 | " | " | " | " | " | " | " | " | " | " | " | " | " | " |
| Zinc oxide | 5 | " | " | " | " | " | " | " | " | " | " | " | " | " | " |
| Accelerator | 0.5 | " | " | " | " | " | " | " | " | " | " | " | " | " | " |
| Sulfur | 3.0 | " | " | " | " | " | " | " | " | " | " | " | " | " | " |
| (A) α,α,α-trichlorotoluene | 3.0 | " | " | " | " | " | " | " | " | " | " | " | " | " | " |
| (B) MgO | 15.0 | " | " | " | " | " | " | " | " | " | " | " | " | " | " |
| Amount of bound acrylonitrile[8] (%) | 40 | 35 | 26 | 35.5 | 32 | 28 | 31.5 | 28 | 24.5 | 24.5 | 24.5 | 24.5 | 24.5 | 28 | 28 |
| Adhesive force (Kg/cm.cord) | 18.1 | 18.2 | 8.0 | 15.5 | 8.0 | 6.0 | 13.0 | 9.5 | 7.5 | 8.14 | 13.5 | 19.4 | 24.0 | 19.9 | 16.4 |

[1] NBR BR and SBR made by Japan Synthetic Rubber Co., Ltd.
[2] Royalene 305, made by Uniroyal, Inc.
[3] Daisolac, made by Osaka Soda Co., Ltd. (Chlorine content: 35%)
[4] Adekaprene, made by Asahi Electro-chemical Co., Ltd. (Chlorine content: 63%)
[5] Paste resin 121, made by Japanese Geon Co., Ltd.
[6] Adeka chlorinated rubber, made by Asahi Electro-chemical Co., Ltd.
[7] Gechron CHR, made by Japanese Geon Co., Ltd.
[8] In the case of a blend of NBR, amount of bound acrylonitrile is calculated by dividing the amount of acrylonitrile bound to NBR by the total amount of polymer.

As seen from Table 5, in any of the rubber compositions containing NBR alone or a blend of NBR, when the rubber composition contains bound acrylonitrile in an amount of at least about 20% by weight based on the amount of total polymer, the rubber composition has a sufficiently high adhesive force for practical purposes.

EXAMPLES 36-45

Rubber compositions containing different kinds of component (B) were prepared according to the compounding recipe shown in the following Table 6, and the adhesive force of the rubber compositions was tested. Compounding of ingredients, vulcanization and adhesive force test were effected in the exactly same manner as described in EXAMPLE 1. The obtained results are shown in Table 6.

Table 6

| Compounding ingredient (parts) | 36 | 37 | 38 | 39 | 40 | 41 | 42 | 43 | 44 | 45 |
|---|---|---|---|---|---|---|---|---|---|---|
| NBR JSR N230S | 100 | " | " | " | " | " | " | " | " | " |
| Carbon black | 50 | " | " | " | " | " | " | " | " | " |
| Silica | 10 | " | " | " | " | " | " | " | " | " |
| Stearic acid | 0.5 | " | " | " | " | " | " | " | " | " |
| Plasticizer | 15 | " | " | " | " | " | " | " | " | " |
| Zinc oxide | 5 | " | " | " | " | " | " | " | " | " |
| Accelerator | 0.5 | " | " | " | " | " | " | " | " | " |
| Sulfur | 3 | " | " | " | " | " | " | " | " | " |
| Component (A) α,α,α,α',α',α'-Hexachloro-p-xylene | 3 | " | " | " | " | " | " | " | " | " |
| Component (B) | | | | | | | | | | |
| Barium carbonate | 15 | — | — | — | — | — | — | — | — | — |
| Magnesium carbonate | — | 15 | — | — | — | — | — | — | — | — |
| Calcium carbonate A* | — | — | 15 | — | — | — | — | — | — | — |
| Surface-treated calcium carbonate AA* | — | — | — | 15 | — | — | — | — | — | — |
| Zinc sulfide | — | — | — | — | 15 | — | — | — | — | — |
| Cupric sulfide | — | — | — | — | — | 15 | — | — | — | — |
| Calcium hydroxide | — | — | — | — | — | — | 15 | — | — | — |

Table 6-continued

| | Example | | | | | | | | | |
|---|---|---|---|---|---|---|---|---|---|---|
| | 36 | 37 | 38 | 39 | 40 | 41 | 42 | 43 | 44 | 45 |
| Magnesium hydroxide | — | — | — | — | — | — | — | 15 | — | — |
| Sanarumin** | — | — | — | — | — | — | — | — | 15 | — |
| Synthetic aluminum silicate | — | — | — | — | — | — | — | — | — | 3 |
| Adhesive force (Kg/cm.cord) | 12 | 17.5 | 13 | 12.5 | 12 | 6 | 15 | 17.5 | 13 | 8 |

*Made by Siraishi Calcium Co., Ltd.
**A mixture of magnesium hydroxide and aluminum hydroxide, made by Kyowa Chemical Industry Co., Ltd.

EXAMPLE 46 and COMPARATIVE EXAMPLE 11

An adhesive force test was effected in the exactly same manner as described in Example 1, except that a rubber composition was prepared according to the recipe shown in the following Table 7 and a brass (Cu/Zn=70/30)-plated steel cord having a diameter of 0.38 mm was used. The obtained results are shown in Table 7.

Table 7

| | Example 46 | Comparative Example 11 |
|---|---|---|
| Compounding ingredient (parts) | | |
| NBR JSR N230S | 100 | " |
| Carbon black | 50 | " |
| Silica | 10 | " |
| Stearic acid | 0.5 | " |
| Plasticizer | 15 | " |
| Zinc oxide | 5 | " |
| Accelerator | 0.5 | " |
| Sulfur | 3 | " |
| (A) α,α,α,α',α',α'-Hexachloro-p-xylene | 3 | — |
| (B) MgO | 15 | — |
| Adhesive force (Kg/cm.cord) | 19.5 | 9.9 |

As seen from Table 7, the method of the present invention is very effective for improving not only the adhesion between NBR and Zn, but also the adhesion between NBR and an alloy containing Zn.

EXAMPLE 47 and COMPARATIVE EXAMPLE 12

Two metal sheets of 10 mm width were arranged so that the length of overlapped portion was 10 mm, and a rubber composition having a thickness of 1 mm was interposed between the metal sheets at the overlapped portion. The assembly was heated at 145° C for 40 minutes by means of an electrically heating press to produce a vibration-damping sheet. A peeling test of the vibration-damping sheet was effected at a peeling rate of 50 mm/min to measure the adhesive force under shear of the sheet.

The following Table 8 shows the compounding recipe of the rubber composition used in this test, and Table 9 shows the results of measurement of the adhesive force.

Table 8

| | Example 47 | Comparative Example 12 |
|---|---|---|
| | (parts) | (parts) |
| NBR JSR N230S | 100 | " |
| Carbon black | 50 | " |
| Silica | 10 | " |
| Stearic acid | 0.5 | " |
| Plasticizer | 15 | " |
| Zinc oxide | 5 | " |
| Accelerator | 0.5 | " |
| Sulfur | 3 | " |
| (A) α,α,α,α',α',α'-Hexachloro-p-xylene | 3 | — |

Table 8-continued

| | Example 47 | Comparative Example 12 |
|---|---|---|
| (B) MgO | 15 | — |

Table 9

| Metal sheet | | Example 47 | Comparative Example 12 |
|---|---|---|---|
| Kind | Thickness | (Kg/cm²) | (Kg/cm²) |
| 18–8 Stainless steel sheet | 0.3 mm | 25.3 | 11.3 |
| Tin-plated iron sheet | 0.3 mm | 28.1 | 12.0 |
| Aluminum sheet | 0.1 mm | 14.0 | 8.9 |
| Zinc sheet | 70 μ | 20.8 | 12.4 |

As seen from Tables 8 and 9, the adhesive force between metal sheets of vibration-damping sheet can be improved by using a rubber compounded with components (A) and (B) of the present invention. That is, according to the method of the present invention, the adhesive force between NBR and various metal materials can be effectively improved.

What is claimed is:

1. A method for adhering a butadiene-acrylonitrile copolymer rubber (NBR) composition to a metal material, which comprises compounding A. at least one of halogenated aromatic hydrocarbons having the following general formula

$$R_n-(Ar)-(CX_mH_{3-m})_{n'} \quad (1)$$

or

$$(Ar)_{n''}-\underset{\underset{R_{3-n''}}{|}}{\overset{\overset{X}{|}}{C}}-R_{3-n''} \quad (2)$$

wherein Ar is benzene nucleus residue or naphthalene nucleus residue and when there are two or more Ar groups, they may be same or different, R is a hydrocarbon residue having 1–6 carbon atoms, hydrogen atom or halogen atom, and when there are two or more R groups, they may be same or different, X is halogen atom and when there are two or more X groups, they may be same or different, when there are two or more $CX_mH_{3-m}$ groups, they may be same or different, $m$ is 1–3, $n''$ is 1–3, and when Ar is benzene nucleus residue, $n$ is 1–6 and $n'$ is 0–5 (provided that $n+n' \leq 6$) and when Ar is naphthalene nucleus residue, $n$ is 1–8 and $n'$ is 0–7 (provided that $n+n' \leq 8$), and B. at least one compound selected from oxides, carbonates, sulfides and hydroxides of metals of groups I, II, IV, V and VIII in the Periodic Table, and aluminum hydroxide, to the NBR composition, the amount of said component (A) being 0.2–20 parts by weight based on 100 parts by weight of total polymer, and the amount of said component (B) being 0.5–10 parts by weight based on 1 part by weight of said component, (A), contacting the resulting rubber composition with the metal material, and vulcanizing the rubber composition to adhere the composition to the metal material.

2. A method according to claim 1, wherein said NBR composition contains, as a rubber, NBR alone or a blend of NBR with at least one polymer selected from butadiene rubber (BR), styrene-butadiene rubber (SBR), chloroprene rubber (CR), natural rubber, isoprene rubber (IR), isobutyleneisoprene rubber (IIR), ethylene-propylene copolymer rubber (EPR, EPDM), chlorinated rubber, epichlorohydrin rubber (CHR), chlorosulfonated polyethylene, polyvinyl chloride (PVC), chlorinated polyethylene and chlorinated polypropylene.

3. A method according to claim 2, wherein the amount of said polymer to be blended to NBR in the NBR composition is 10–50 parts by weight based on 100 parts by weight of the NBR.

4. A method according to claim 1, wherein the amount of bound acrylonitrile contained in the NBR composition is 15–60 parts by weight based on 100 parts by weight of total polymer.

5. A method according to claim 4, wherein the amount of bound acrylonitrile contained in the NBR composition is 20–50 parts by weight based on 100 parts by weight of total polymer.

6. A method according to claim 1, wherein said metal material is a member selected from zinc, zinc alloy, iron, steel, copper, bronze, lead, aluminum, nickel and tin.

7. A method according to claim 6, wherein said metal material is zinc or zinc alloy.

8. A method according to claim 7, wherein said zinc alloy is brass.

9. A method according to claim 1, wherein said component (A) is a compound selected from α,α,α-trichlorotoluene, α,α,α,2-tetrachlorotoluene, α,α,α,3-tetrachlorotoluene, α,α,α,4-tetrachlorotoluene, α,αλ,α,2,4-pentachlorotoluene, α,α,α,α',α',α'-hexachloro-o-xylene, α,α,α,α',α',α'-hexachloro-m-xylene, α,α,α,α',α',α'-hexachloro-p-xylene, α,α-dichlorodiphenylmethane, α-chlorotriphenylmethane, α,α,α-tribromotoluene and α-bromotriphenylmethane.

10. A method according to claim 9, wherein said component (A) is α,α,α-trichlorotoluene, α,α,α,2-tetrachlorotoluene, α,α,α,3-tetrachlorotoluene, α,α,α,4-tetrachlorotoluene, α,α,α,2,4-pentachlorotoluene, α,α,α,α'α'-hexachloro-m-xylene or α,α,α,α'α'α'-hexachloro-p-xylene.

11. A method according to claim 1, wherein the compounding amount of said component (A) is 0.5–10 parts by weight based on 100 parts by weight of total polymer.

12. A method according to claim 1, wherein said component (B) is a compound selected from lead oxide, zinc oxide, magnesium oxide, barium carbonate, calcium carbonate, magnesium carbonate, zinc sulfide, cupric sulfide, magnesium hydroxide, aluminum hydroxide and calcium hydroxide.

13. A method according to claim 12, wherein said component (B) is a compound selected from lead oxide, zinc oxide, magnesium oxide, barium carbonate, calcium carbonate, magnesium carbonate, zinc sulfide, magnesium hydroxide and calcium hydroxide.

14. A method according to claim 1, wherein the compounding amount of said component (B) is 1–7 parts by weight based on 1 part by weight of said component (A).

15. A method for adhering a butadiene-acrylonitrile copolymer rubber (NBR) composition having a bound acrylonitrile content of 20–50 parts by weight based on 100 parts by weight of total polymer to zinc, which comprises compounding A. α,α,α-trichlorotoluene, α,α,α,2-tetrachlorotoluene, α,α,α,3-tetrachlorotoluene, α,α,α,4-tetrachlorotoluene, α,α,α,2,4-pentachlorotoluene, α,α,α,α',α',α'-hexachloro-m-xylene or α,α,α,α',α',α'-hexachloro-p-xylene, and B. at least one compound selected from lead oxide, zinc oxide, magnesium oxide, barium carbonate, calcium carbonate, magnesium carbonate, zinc sulfide, magnesium hydroxide and calcium hydroxide, to the NBR composition, the amount of said component (A) being 0.5–10 parts by weight based on 100 parts by weight of total polymer, and the amount of said component (B) being 1–7 parts by weight based on 1 part by weight of said component (A), contacting the resulting rubber composition with zinc, and vulcanizing the rubber composition to adhere the composition to zinc.

16. A method for adhering a butadiene-acrylonitrile copolymer rubber (NBR) composition containing a blend composed of 100 parts by weight of NBR and 10–50 parts by weight of polyvinyl chloride (PVC) to a metal material, which comprises compounding A. at least one of halogenated aromatic hydrocarbons having the following general formula

or

wherein Ar is benzene nucleus residue or naphthalene nucleus residue and when there are two or more Ar groups, they may be same or different, R is a hydrocarbon residue having 1–6 carbon atoms, hydrogen atom or halogen atom and when there are two or more R groups, they may be same or different, X is halogen atom and when there are two or more X groups, they may be same or different, when there are two or more $CX_mH_{3-m}$ groups, they may be same or different, $m$ is 1–3, $n''$ is 1–3, and when Ar is benzene nucleus residue, $n$ is 1–6 and $n'$ is 0–5 (provided that $n+n' \leq 6$) and when Ar is napthalene nucleus residue, $n$ is 1–8 and $n'$ is 0–7 (provided that $n+n' \leq 8$), and B. at least one compound selected from oxides, carbonates, sulfides and hydroxides of metals of Groups I, II, IV, V and VIII in the Periodic Table and aluminum hydroxide, to the NBR composition, the amount of said component (A) being 0.2–20 parts by weight based on 100 parts by weight of total polymer, and the amount of said component (B) being 0.5–10 parts by weight based on 1 part by weight of said component (A), contacting the resulting rubber composition with the metal material, and vulcanizing the rubber composition to adhere the composition to the metal material.

17. A composite body consisting of an NBR composition and a metal material, which is prepared by the method of claim 1.

* * * * *